May 5, 1936.　　　　C. C. MAGEE　　　　2,039,544

PARKING METER

Filed Dec. 21, 1932　　　4 Sheets-Sheet 1

May 5, 1936.   C. C. MAGEE   2,039,544
PARKING METER
Filed Dec. 21, 1932   4 Sheets-Sheet 2
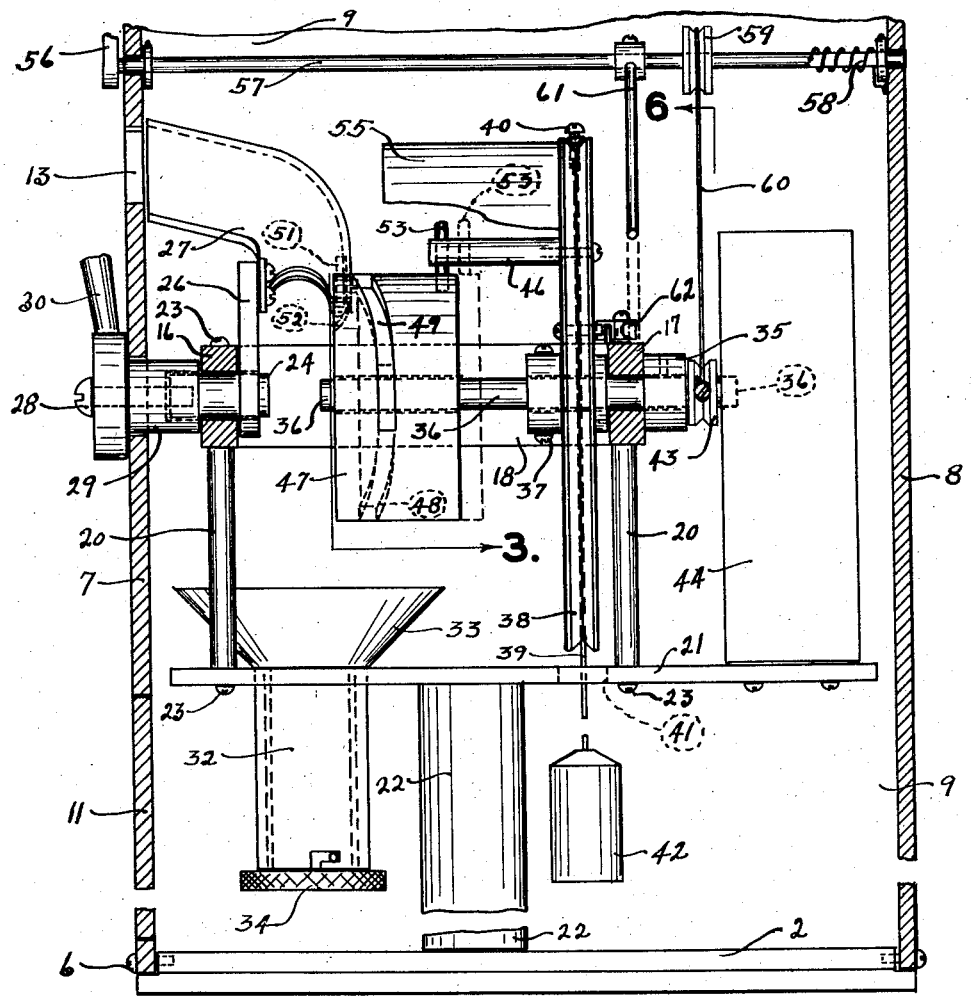
FIG. 2.
FIG. 3.
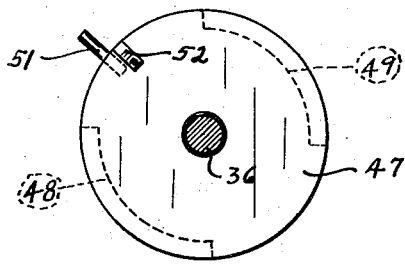
Carl C. Magee
INVENTOR.
BY Loyal J. Miller
ATTORNEYS.

May 5, 1936.  C. C. MAGEE  2,039,544

PARKING METER

Filed Dec. 21, 1932  4 Sheets-Sheet 3

Carl C. Magee
INVENTOR.

BY Loyd J. Miller
ATTORNEYS.

May 5, 1936.  C. C. MAGEE  2,039,544
PARKING METER
Filed Dec. 21, 1932  4 Sheets-Sheet 4

Carl C. Magee INVENTOR.
BY Loyd Miller
ATTORNEYS.

Patented May 5, 1936

2,039,544

UNITED STATES PATENT OFFICE 2,039,544

PARKING METER

Carl C. Magee, Oklahoma City, Okla., assignor to Dual Parking Meter Company, Oklahoma City, Okla., a corporation of Delaware Application December 21, 1932, Serial No. 648,267

5 Claims. (Cl. 194—84)

My invention relates to apparatus for automatically timing vehicle parking, collecting revenue for occupancy of the parking space, and to the method of carrying out such timing and collecting.

At the present time most municipalities of any considerable size have ordinances placing by law a time limit upon vehicle parking in specified zones or upon prescribed streets. So far as I know or have been able to ascertain, the only method heretofore used for determining the occurrence of violations of such ordinances consists of manually marking a vehicle tire when, or about the time, it is parked, and again checking the tire to see that the vehicle has, or has not, been moved within the specified time limit. In order to competently enforce such ordinances considerable expense has been entailed in the employment of officers to mark and check time on the vehicles, and at the best most ordinances of this scope are only partially enforced. A person knowing how long he has parked may erase the mark upon the tire, or may drive the vehicle out of the parking space and back into it again and thus remove the tire markings and prevent apprehension. It is of course possible to number or otherwise designate each parking space and to then have the officer keep a written record of the time, vehicle number, and specific parking space within which each vehicle is parked, but the expense and time required by such procedure has proven prohibitive in most instances where it has been tried.

My invention is designed not only to permit the economical enforcement of parking ordinances, but also to collect for the municipality a revenue, or tax, from such vehicle parking. The use of my device will enable one officer to competently cover a large area of parking space, and at the same time will prevent a driver from evading the required payment.

The objects of my invention are to provide a device and method of this class which is new, novel, practical and of utility; which is strong and durable; which is simple in operation; which is comparatively cheap to manufacture; and, which will be efficient in accomplishing all of the purposes for which it is intended.

This invention, of course, contemplates the passage of proper ordinances and the levy of desired penalties for infraction of such ordinances.

With these and other objects in view as will more fully appear, my invention consists in the construction, novel features and combination of parts hereinafter more fully described, pointed out in the claims hereto appended and illustrated in the accompanying four sheets of drawings, of which, Figure 1 is a perspective view of one embodiment of the housed device installed for use upon a street curb;

Fig. 2 is a vertical sectional view taken along the line 2—2 of Fig. 1;

Fig. 3 is a sectional view taken on the line 3—3 of Fig. 2;

Like characters of reference designate like parts in all the figures.

Figure 1:
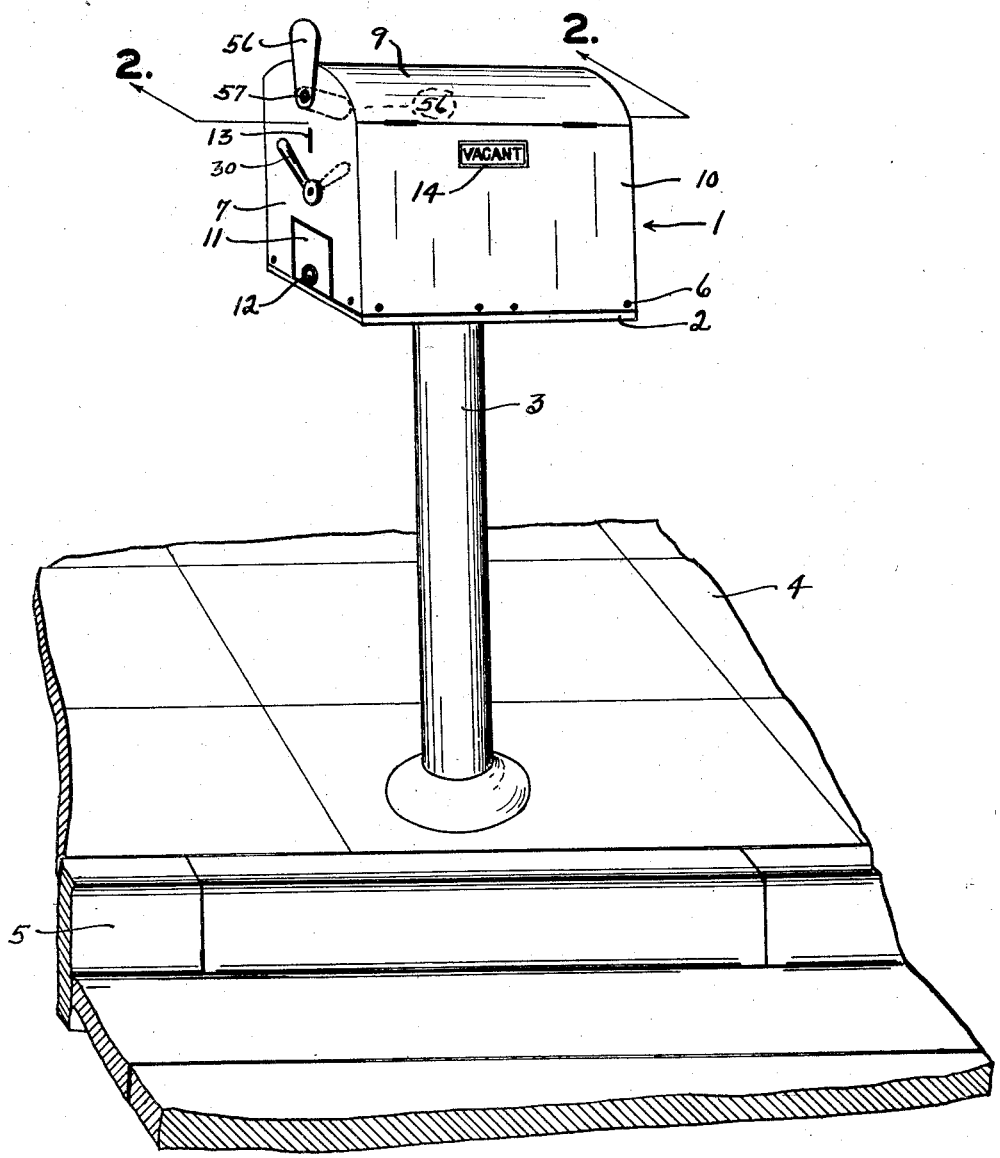

It is understood that various changes in the form, proportion, size, shape, weight and other details of construction, within the scope of my invention, may be resorted to without departing from the spirit and broad principle of my invention and without sacrificing any of the advantages thereof; and it is also understood that the drawings are to be interpreted as being illustrative and not restrictive.

One practical embodiment of my invention is illustrated in the drawings, as follows:

The reference numeral 1 indicates as a whole a housing for the operating mechanism more fully described hereinbelow. Said housing 1 consists substantially of a floor 2 mounted rigidly upon a pedestal or other support 3 which is firmly anchored by any desired means to the earth or side walk 4 adjacent the edge of a street or a curbing 5. Upon the floor 2 are rigidly yet removably connected by any usual means such as welding or by bolts 6 two upright ends 7 and 8. A one-piece side and top 9 may be similarly attached to the floor 2 and fill the space between similar side and top edges of the ends 7 and 8. A hinged side 10 completes the housing 1.

Said end 7 is provided with a door 11 having a lock 12, and is also provided with a through slot 13 for permitting the insertion therethrough of a coin, not shown. The side 10 is provided with a glass covered window 14 the office of which will be more fully described hereinbelow.

The operating mechanism of the device is housed within the housing 1 and consists substantially of a rectangular frame 15 having parallel sides 16 and 17 and ends 18 and 19. Said frame is supported at each corner by a post or leg 20 attached upon a rigid platform 21 supported in spaced relation above said floor 2 by any usual means such as a pedestal 22. The legs 20 are attached to the platform 21 and to the frame 15 by any desired means such as bolts 23.

At a point intermediate its ends the side 16 of said frame 15 is transversely perforated to rotatively receive a shaft 24 which is of a length somewhat greater than the thickness of the side 16 and which protrudes both inwardly and outwardly from said side. To the inner end of said shaft 24 is rigidly attached by a set-screw 25 one end of a perpendicular arm 26, to the free end of which is rigidly attached a coin conveyor 27. The outer end portion of said shaft 24 is connected by a stud-bolt 28 to the sleeve portion 29 of a lever arm 30. The lever arm 30 is located exteriorly of the housing 1 and the sleeve portion 29 passes through a perforation provided therefor in the end 7 of the housing. A retrieving spring 31 (Fig. 4), is connected at one end to the arm 26 and at its other end to the end 18 of the frame 15. The spring 31 acts as a means of normally holding the upper end of the coin conveyor 27 in registration with the slot 13 in the end 7 of the housing. Movement of the lever arm 30 in a clock-wise direction, when facing said end 7 of the housing 1 will in turn rotate said shaft 24 and will consequently move the coin conveyor 27 in an arc toward the end 19 of said frame 15. Directly beneath the lower end of the coin conveyor when it is at the end of its throw toward said end 19 of said frame 15, the platform 21 is provided with a tubular coin receiving and stacking receptacle 32 having a flared upper end portion 33 and a removable bottom 34.

At a point in axial alinement with said shaft 24, the side 17 of said frame 15 is provided with a transverse perforation and is also provided with a larger outwardly protruding bearing-boss 35 through which the last mentioned perforation extends. The last mentioned perforation rotatively receives a second shaft 36 which extends inwardly of the frame 15 to a point slightly past the inner edge of said coin conveyor 27 (Figs. 2 and 4), and which extends outwardly past the outer end of said bearing-boss 35.

Rigidly connected to said shaft 36 by a set-screw 37, within said frame 15 and adjacent the side 17 thereof is provided a sheave 38 having a cord or cable 39 attached at one of its ends thereto by a stud-bolt 40. Said cable 39 extends along the groove of the sheave 38 and its free end extends through a perforation 41 in the platform 21 and therebelow is connected to a weight 42 which acts to urge the rotation of the sheave 38 in a counter-clockwise direction when facing said end 7 of the housing 1. Adjacent said bearing-boss 35, said shaft 36 is rigidly provided with a second and smaller sheave 43 the office of which will be fully described hereinbelow. The extreme outer end portion of said shaft 36 is connected to any desired speed governing means 44 such as a gear train or the like. The means 44 acts to regulate the speed at which said weight 42 may rotate said sheave 38.

The sheave 38 is adapted to be rotated through only a part of a complete revolution and has an outwardly extending pin 45 which contacts the upper surface of the side 17 of said frame 15 and stops such rotation when the sheave 38 has rotated to a desired extent. Said sheave 38 is also provided with an inwardly extending pin 46 the office of which will be fully described hereinbelow.

Figure 4:
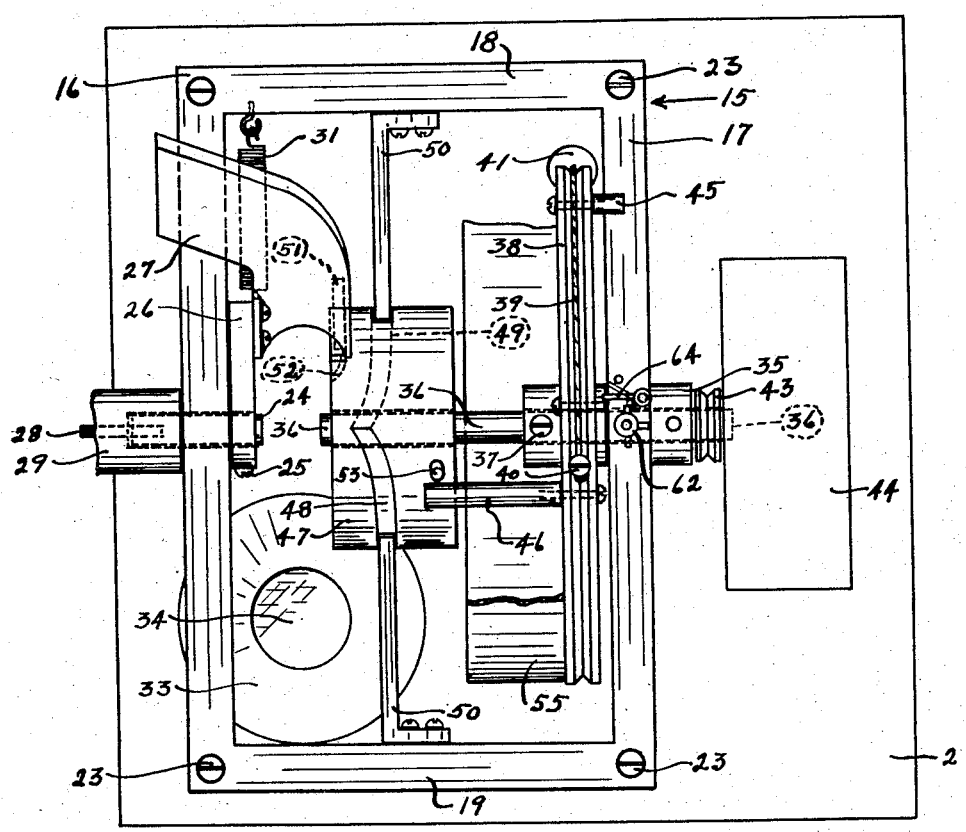
Fig. 4 is a top view of the operating mechanism, the top of the housing being removed.

Rotatively and slidably disposed upon the inner end portion of said shaft 36 is provided a heavy cylindrical metal disc 47 which is detailed in Fig. 3, the periphery of which is provided with diametrically opposed superficial grooves 48 and 49. As best seen in Figs. 2 and 4, said grooves extend at right angles to the shaft 36 for the greater portion of their length, but at the extreme left end of each, looking in the direction indicated by the section line 3 of Fig. 2, they curve toward the front or near end of the disc. The ends 18 and 19 of said frame 15 are each provided with a rigid guide bar 50 the free end of each of which extends into one of said guide-grooves. When the disc 47 is partially rotated in a clock-wise direction the guide-bars 50 co-act with the grooves 48 and 49 to force the disc to slide upon said shaft 36 in a direction toward said sheave 38 when the disc 47 reaches the approximate end of its throw. Square shoulders at each end of the grooves 48 and 49 co-act with the guide-bars 50 to limit the rotation of the disc. The periphery of the disc 47 is provided with a protruding pin 51 which acts as a stop for the coin-conveyor 27 and normally holds the coin-conveyor in alinement with said slot 13 in the end 7 of said housing 1. At a point slightly above said pin 51, the forward end of said disc 47 is provided adjacent its periphery with a superficial groove 52 which is adapted to receive the edge of a coin, not shown, when the coin is inserted into the coin-conveyor and when it reaches and protrudes partially from the lower end of said conveyor. Said groove is arcuate at its lower end, and as long as the disc 47 is at the forward end of its longitudinal throw upon said shaft 36, the coin will be held partially within said conveyor and will act as a link between the conveyor and the disc 47. When the coin is in the above described position, any clock-wise movement of said lever arm 30 will cause a like movement of said disc 47. The periphery of the disc is provided with a protruding pin 53 which contacts the previously described pin 46 carried by the sheave 38 and forces the sheave to rotate with the disc 47 when the disc is rotated in a clock-wise direction. When the disc 47 reaches the end of its throw, the guide-arms 50 co-acting with the grooves 48 and 49 cause the disc to move longitudinally upon the shaft 36 and this longitudinal movement releases the coin from the groove 52 and permits it to fall out of the coin-conveyor into the receptacle 32. When the lever arm is now released, said spring 31 returns the coin-conveyor 27 and the disc 47 to their normal positions, but the speed governing mechanism 44 retards against the action of the weight 42 for a desired time, the rotation of said shaft 36 and sheave 38.

As may best be seen in Figs. 2 and 4, the sheave 38 is provided with a tubular extension or annular flange 55 which is located within the housing 1 directly in line with said window 14. The flange is provided for the purpose of bearing desired indicia to visually inform a person how much of his allotted time has expired, or other desired information of a similar nature.

Figure 5:
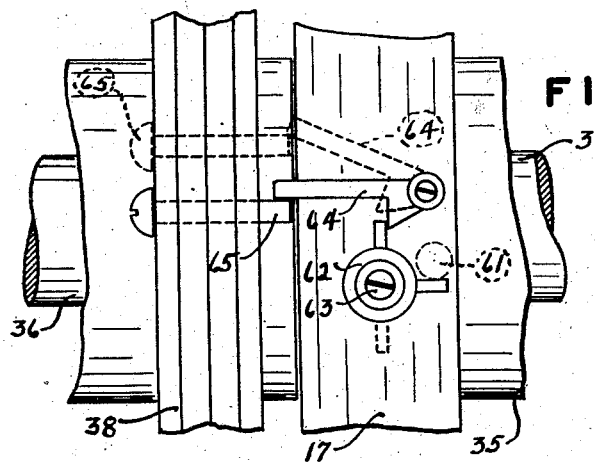
Fig. 5 is an enlarged detail of a portion of the operating mechanism.
Figure 6:
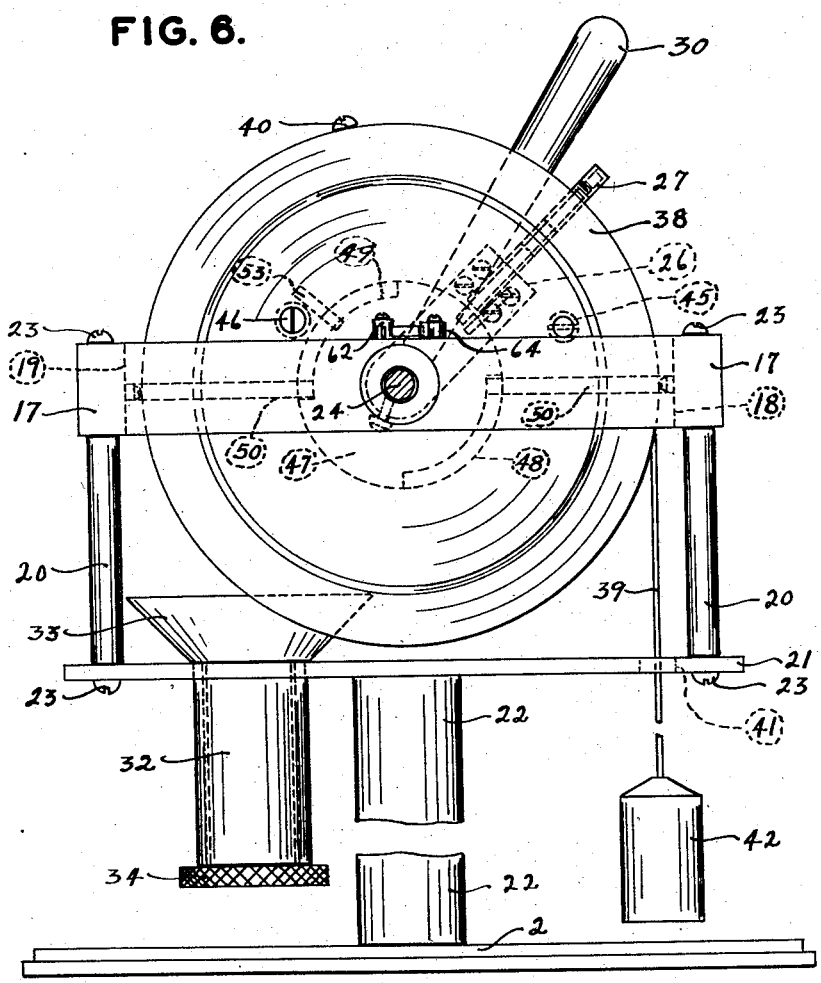
Fig. 6 is a vertical sectional view of the mechanism taken along the line 6—6 of Fig. 2, the housing being removed.

In order that an officer may tell at a glance if a car is parked over-time, a flag or arm 56 is located exteriorly of the housing adjacent the top of the end 7 thereof. The arm 56 is rigidly keyed to the protruding end of a shaft 57 which is mounted for rotation in the housing ends 7 and 8. The shaft 57 is urged by a spring 58 to normally hold said arm 56 in an upright position so that it may be seen above the housing from all directions. The following described mechanism is provided for the purpose of holding the arm 56 in a horizontal position below the top of the housing until the predetermined parking time limit has been reached and for then automatically releasing the arm to the action of said spring 58. At a point in alinement with the previously described small sheave 43 the shaft 57 is equipped with a similar sheave 59 which is keyed or otherwise firmly attached thereto. A cable 60 is connected firmly between the two sheaves 43 and 59 so that when the shaft 36 is partially rotated by use of the lever arm 30, the shaft 57 is likewise partially rotated. This partial rotation brings the free end of a rod 61 which is rigidly attached at its other end to said shaft 57, into engagement with a latch or retaining mechanism carried by the upper surface of the side 17 of said frame 15. This latch mechanism is best illustrated in Fig. 5, and consists substantially of bell-crank 62 pivotally mounted upon a pin 63 and urged to rotate through substantially one-fourth of a complete circle by a spring, not shown, but which is similar in action to said spring 58 on said shaft 57. A pivotally mounted latch 64 is provided for engaging one arm of the bell-crank 62 when the rod 61 forces it past the latch. When the latch engages the bell-crank, the rod 61 is held against movement by the other arm of the bell-crank. A pin 65 carried by the adjacent face of the sheave 36 is adapted to contact the free end of the latch 64 and release the bell-crank 62 when the sheave reaches the end of its partial rotation. When the bell-crank is released, the rod 61 is consequently released, and the spring 68 is then free to partially rotate said shaft 57, and thus return the flag 56 to its upright position. Other desired mechanism may be provided for giving the visual signal.

One of the particular features of the herein disclosed coin operated starting mechanism and the timing mechanism connected thereto, lies in the arrangement whereby the coin may be inserted and the timing mechanism may be re-set or brought back to its original starting position, regardless of how much of the allotted time has been used by the person inserting the next previous coin. This makes it possible for a person to drive into a parking space, insert his coin into the device, and start his own allotted parking time without having to wait for the expiration of the time period allotted the last person using the space. A device for timing vehicle parking which did not embody this feature, would not be practical.

It is thought that the foregoing description has dealt with the operation of the device sufficiently to permit one versed in the art to use the same, and that further description would be superfluous.

Although the description herein has dealt with the device as used upon streets, it will be apparent that the device could be used equally as well in parking lots, automobile hotels, and the like. It is also obvious that other coin operated time gauging mechanisms could be designed for accomplishing the desired results, and I therefore reserve the right to use such other mechanisms in a manner falling within the scope of the appended claims.

Obviously the invention is susceptible of embodiment in forms other than that which is illustrated in the accompanying drawings and described herein, and is applicable for uses and purposes other than as detailed, and I therefore consider as my own all such modifications and adaptations and other uses of the form of the device herein described, as fairly fall within the scope of my invention.

Having thus described my invention, what is claimed and desired to be secured by Letters Patent, is:

1. In a coin operated device, the combination with power driven mechanism for a desired purpose, of means for putting the mechanism into operation including, a housing having a coin slot through one wall, a coin conveyor within the housing and normally having its upper end in registration with said slot, means for pivotally mounting said conveyor to move in an arc away from said slot, means exterior of the housing for so moving said conveyor, a rotatively mounted disc having one end located adjacent and slightly below the lower end of said conveyor and normally in a position for preventing a coin from dropping from said conveyor, said disc having a superficial groove in its end for engaging a coin partially confined within the lower end of said conveyor, the coin co-acting with the groove to partially rotate said disc when the conveyor is moved in its arcuate path, means for moving the disc longitudinally away from the conveyor for releasing the coin when the disc reaches the approximate end of its rotation, and operative connections for starting operation of the power driven mechanism when the coin is released.

2. A coin operated device comprising, a pivotally mounted coin chute, means for pivotally moving said chute, a rotatively mounted disc having a superficial groove, said disc disposed with the groove in position to receive a portion of a coin within the chute and to hold the coin in engagement with the chute, said disc adapted to be rotated by the coin when the chute is pivotally moved, a cam for moving the disc axially away from the chute to release the coin to gravitation as the disc is rotated, and operative connections for actuating a mechanism when the disc is rotated.

3. A coin operated device comprising, a housing having a coin slot through one wall, a coin conveyor within the housing and normally having its upper end in registration with said slot, means for pivotally mounting said conveyor to move in an arc away from said slot, means exterior of the housing for so moving said conveyor, a rotatively mounted disc having one end located adjacent and slightly below the lower end of said conveyor and normally in a position for preventing a coin from dropping from said conveyor, said disc having a superficial groove in its end for engaging a coin partially confined within the lower end of said conveyor, the coin co-acting with the groove to partially rotate said disc when the conveyor is moved in its arcuate path, means for moving the disc axially away from the conveyor for releasing the coin when the disc reaches the approximate end of its rotation, and operative connections for starting operation of a mechanism when the coin is released.

4. A coin operated device comprising, a pivotally mounted coin chute, a rotatably mounted disc-like element adjacent one end of the chute, means for starting actuation of a mechanism when the element is rotated, means whereby a coin in the chute engages the element and causes its rotation when the chute is rotated, and a cam for moving the element axially and separating the chute and element to release the coin to gravitate from the slot during the rotation of the chute.

5. A coin operated device comprising, a pivotally mounted coin chute, a rotatably mounted disc adjacent the exit end of the chute, means for starting actuation of mechanism when the disc is rotated, means whereby a coin in the chute engages the disc and causes its rotation when the chute is rotated, and a cam for moving the disc axially away from the chute and releasing the coin to gravitation when the disc is rotated to a desired radial position.

CARL C. MAGEE.